United States Patent
Blaski et al.

(10) Patent No.: US 10,240,624 B2
(45) Date of Patent: Mar. 26, 2019

(54) ASSEMBLY AND METHOD FOR MINIMIZING AN OVERLAP OF A COMPOSITE MEMBER RIVETED TO ANOTHER MEMBER

(71) Applicant: GM Global Technology Operations LLC, Detroit, MI (US)

(72) Inventors: Bradley J. Blaski, Sterling Heights, MI (US); Richard C. Janis, Grosse Pointe Woods, MI (US); Pei-chung Wang, Troy, MI (US); Douglas M. Linn, White Lake, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 315 days.

(21) Appl. No.: 15/238,438

(22) Filed: Aug. 16, 2016

(65) Prior Publication Data
US 2018/0051730 A1    Feb. 22, 2018

(51) Int. Cl.
*F16B 19/08* (2006.01)
*F16B 5/04* (2006.01)

(52) U.S. Cl.
CPC ............... *F16B 5/04* (2013.01); *F16B 19/08* (2013.01)

(58) Field of Classification Search
USPC ...................................... 411/501; 403/408.1
See application file for complete search history.

(56) References Cited

U.S. PATENT DOCUMENTS

| | | | | |
|---|---|---|---|---|
| 2,302,772 A | * | 11/1942 | Huck | F16B 5/04 29/524.1 |
| 5,720,144 A | * | 2/1998 | Knudson | E04C 3/07 29/416 |
| 5,738,475 A | * | 4/1998 | Chaban | E05D 5/12 16/193 |
| 6,694,597 B2 | | 2/2004 | Wang et al. | |
| 6,835,020 B2 | * | 12/2004 | Wang | B21J 15/025 403/278 |
| 7,219,870 B2 | * | 5/2007 | Olsson | B60N 2/161 248/419 |
| 7,454,838 B2 | * | 11/2008 | Gianola | B26B 13/28 30/254 |
| 8,250,728 B2 | | 8/2012 | Stevenson et al. | |
| 8,739,388 B2 | * | 6/2014 | Campbell | B32B 7/08 29/521 |
| 9,828,040 B2 | * | 11/2017 | Campbell | B62D 27/02 |

(Continued)

*Primary Examiner* — Gary W Estremsky

(57) ABSTRACT

An assembly and method for minimizing an overlap of a composite member riveted to another member includes a first member having a first overlap area and a second member having a second overlap area. The overlap areas of the first and second members are in direct contact, thereby forming an overlapped region. The overlapped region may be thicker than the sum of the individual members. The second member includes an end defining a projection in the overlapped region. The rivet is disposed through the first member and at least partially through the second member in the projection, thereby interlocking the second member to the first member. The projections include a curved symmetrical body defining an apex. The rivet extends through the body such that a line extending from the center axis of the rivet is perpendicular to a tangent extending through the apex of the projection.

12 Claims, 4 Drawing Sheets

(56) References Cited

U.S. PATENT DOCUMENTS

2007/0169605 A1* 7/2007 Szymanski ............ B23D 61/06
 83/834
2009/0259094 A1* 10/2009 Bouchier .............. A61F 2/0045
 600/37

* cited by examiner

ASSEMBLY AND METHOD FOR MINIMIZING AN OVERLAP OF A COMPOSITE MEMBER RIVETED TO ANOTHER MEMBER

TECHNICAL FIELD

The invention relates to an assembly and method for joining a composite member to another member using a rivet, and more particularly to an assembly and method for minimizing an overlap of a composite member joined with another member using a self-piercing rivet.

BACKGROUND

The manufacture of automotive vehicles often requires that metallic members be attached to each other. Pierce riveting is one potential method of attaching such members, particularly, steel or aluminum sheets. Pierce riveting typically requires a sharpened end portion of a rivet to pierce through a first of two stacked metallic sheets, and through at least a portion of the second of the stacked sheets. During such piercing, the sharpened end portion of the rivet is typically deformed or bent to secure the rivet to the metallic sheets, thereby interlocking the metallic sheets into an assembly.

For improved weight savings, non-structural metallic members may be replaced with a composite material such as a thermoplastic. Thermoplastics are a polymeric material that becomes pliable and moldable above a specific temperature, which would be ideal in the manufacturing of automotive components such as door panels, body fenders, bumper covers, and the likes. Thermoplastics may be reshaped by heating and formed into automotive components by various polymer processing techniques such as injection molding, compression molding, and extrusion. However, below its glass transition temperature (Tg), thermoplastic composites commonly used in automotive applications, such as fiber reinforced thermoplastics (e.g. polystyrenes, polycarbonates, and poly-vinyl-chlorides), are less ductile and more brittle than that of metallic members.

Self-piercing rivets may be used to join a thermoplastic composite member to a metallic member, or a thermoplastic composite member to another thermoplastic composite member. However, when a rivet is pierced close to an edge of the thermoplastic member, the amount of impact force required to drive the rivet through the members and to deform the sharpened end of the rivet to interlock the two members may result in micro-cracks between the rivet and edge of the less ductile and brittle thermoplastic member, resulting in the weakening of the rivet joint. To compensate, the edge of the thermoplastic member may be extended to increase the overlap of the composite member and the other member. This increased overlap provides sufficient distance between the rivet and the edge of the thermoplastic member to provide the structural integrity necessary to avoid the formation of cracks. However, the increase in length of the thermoplastic member results in increased material usage, weight, and increased in the overall size of the final assembly resulting in a need for a redesign of the form factor of the component.

Thus, there is a need for improved pierce riveting techniques for achieving high integrity attachment of a thermoplastic member to a thermoplastic or non-thermoplastic member while minimizing the overlap of the thermoplastic member with the other member.

SUMMARY

An assembly includes a first member having a first overlap area, a second member having a second overlap area, wherein the overlap area of the first member is in direct contact with the overlap area of the second member, thereby forming an overlapped region, and wherein the second member includes an end defining a projection in the overlapped region. The rivet is disposed through the first member and at least partially through the second member in the projection, thereby interlocking the second member to the first member.

In one aspect, at least one of the longitudinal projections include a body defining an apex. The rivet extends through the body such that a line extending from the center axis of the rivet is perpendicular to a tangent extending through the apex.

In another aspect, each of the plurality of longitudinal projection is a curved symmetrical structure defining a scalloped shape distal end.

In another aspect, the distal end of the second member further defines a curved recess separating adjacent curved symmetrical structures; thereby defining an undulating scalloped shape end.

In another aspect, each of the adjacent curved symmetrical structures includes a first radius and the curved recess includes a second radius, wherein the first radius is greater than the second radius.

In another aspect, the rivet includes an outer tubular diameter, and wherein the central axis of the rivet is at least 2.0 tubular diameters from the curve apex In another aspect, the assembly may also include a washer in contact with the second surface of the second member in the overlapped region. The rivet may be deformed radially outward from the central axis of the rivet and axially in the direction of the second surface of the second member, thereby interlocking the washer against the second surface of the second member.

In another aspect, the first member includes a first member thickness and the second member includes a second member thickness, and the overlapped region may include an overlapped region thickness that is equal to the sum of the thicknesses of the first and second members.

In another aspect, the second member is a polymeric material comprising a thermoplastic selected from the group consisting of Polypropylene (PP), Polyurethane (PUR), Poly-Vinyl-Chloride (PVC), Acrylonitrile Butadiene Styrene (ABS), Polyamide (PA, Nylon 6/6, and Nylon 6), Polystyrene (PS), Polyethylene (PE), Polyoxymethylene (POM), Polycarbonate (PC), Polyethylene Terephthalate (PET), and Acrylonitrile styrene acrylate (ASA).

An alternative embodiment of an assembly is provided. The assembly includes a first member having a first surface and an opposite facing second surface defining a reverse chamfered segment; a second member having a first surface defining a reverse chamfered segment and an opposite facing second surface, wherein the reverse chamfered segment of the first member is overlapped with the reverse chamfered segment of the second member, thereby forming an overlapped region; and at least one rivet extending through the first member and at least partially through the second member in the overlapped region interlocking the second member to the first member. The reverse chamfered segment of the first member is complementary to the reverse chamfered segment of the second member.

In one aspect, the first member includes a first member thickness and the second member includes a second member thickness, and the overlapped region may include an overlapped region thickness that is greater than the sum of the thicknesses of the first and second members.

In another aspect, the second member includes a distal end defining a plurality of adjacent curved symmetrical structures and a curved recess separating immediately adjacent curved symmetrical structures, thereby defining an undulating scallop shaped distal end In another aspect, a washer may be disposed on the second surface of the second member in the overlapped region. The at least one rivet may extend through the second member and deformed against the washer, thereby interlocking the washer against the second surface of the second member.

A method of joining two members is provided. The method comprises the steps of: (a) placing a first member, having a first surface and an opposite facing second surface defining an overlap area, onto a second member, having a first surface defining an overlap area and an opposite facing second surface, such that the overlap area of the first member is in direct contact with the overlap area of the second member, thereby forming an overlapped region; (b) driving at least one rivet through the first member and at least partially through the second member in the overlapped region, wherein the at least one rivet includes a head portion defining a bottom surface and a tubular portion extending outwardly from the bottom surface of the head along a central axis, and the tubular portion includes a tapered edge; and (c) deforming the tubular portion and tapered edge radially outward from the central axis of the rivet, thereby interlocking the second member to the first member, wherein the second member includes a distal end in the overlapped region defining at least one curved projection. The second member includes a polymeric material selected from the group consisting of Polypropylene (PP), Polyurethane (PUR), Poly-Vinyl-Chloride (PVC), Acrylonitrile Butadiene Styrene (ABS), Polyamide (PA, Nylon 6/6, and Nylon 6), Polystyrene (PS), Polyethylene (PE), Polyoxymethylene (POM), Polycarbonate (PC), Polyethylene Terephthalate (PET), and Acrylonitrile styrene acrylate (ASA). The second member includes a distal end in the overlapped region defining at least one curved projection which may be a curved symmetrical structure defining a curve apex. The rivet may be driven in the overlapped region where a radius extending from the central axis of the rivet is perpendicular to a tangent extending through the curve apex, and at a distance from the curve apex such that the curved symmetrical structure provides sufficient structural integrity to prevent fracturing of the second member in the overlapped region resulting from the driving and deforming of the rivet.

In one aspect, a washer may be placed against the second surface of the second member in the overlapped region. The rivet may be driven through the second member in the overlapped region such that the tapered edge extends beyond the second surface of the second member and through the washer. The tapered edge of the rivet may be deformed radially outward from the central axis of the rivet and axially in contact with the washer in the direction of the second surface of the second member, thereby interlocking the washer against the second surface of the second member. The overlap area of the second surface of the first member may define a reverse chamfered segment and the overlap area of the second member may define a reverse chamfered segment complementary to the reverse chamfered segment of the first member. The thickness in the overlapped region is greater than the sum of the thickness of the first member and the second member immediately before the overlap areas of each of the respective members.

BRIEF DESCRIPTION OF THE DRAWINGS

The above and other aspects will become more apparent and more readily appreciated from the following description of exemplary embodiments, taken in conjunction with the accompanying drawings in which.

DESCRIPTION

Figure 1:
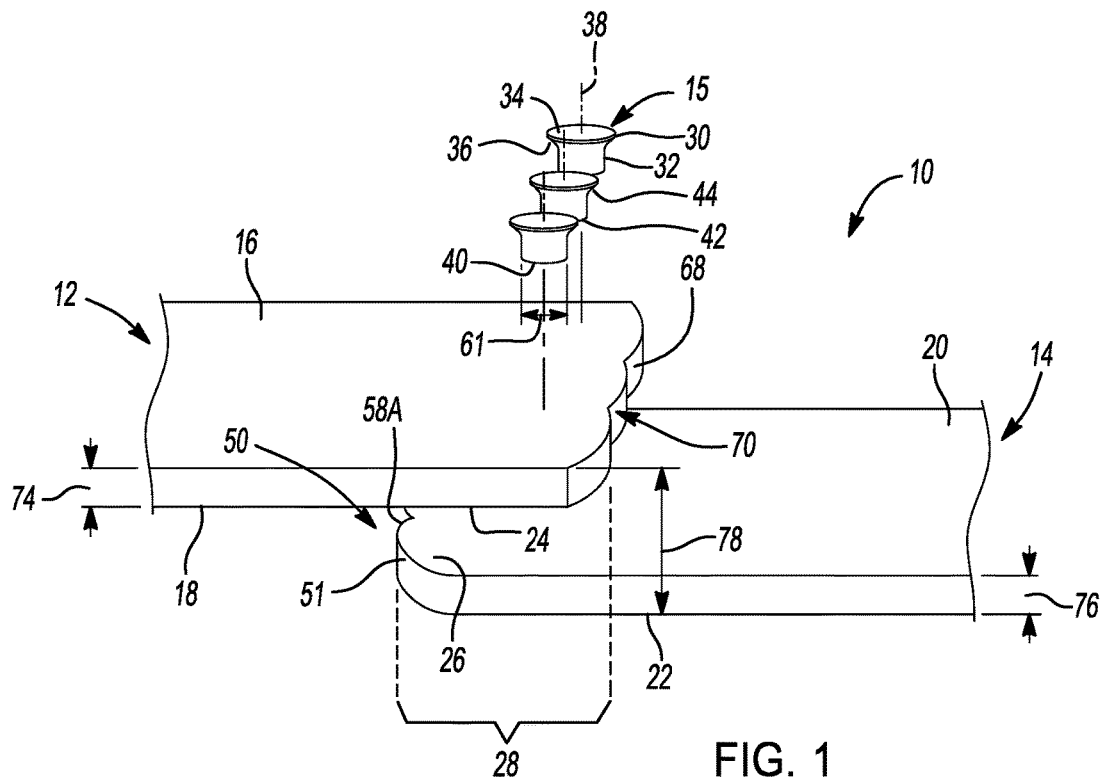
FIG. 1 shows an exploded perspective illustration of a first embodiment of the invention.
Figure 2:
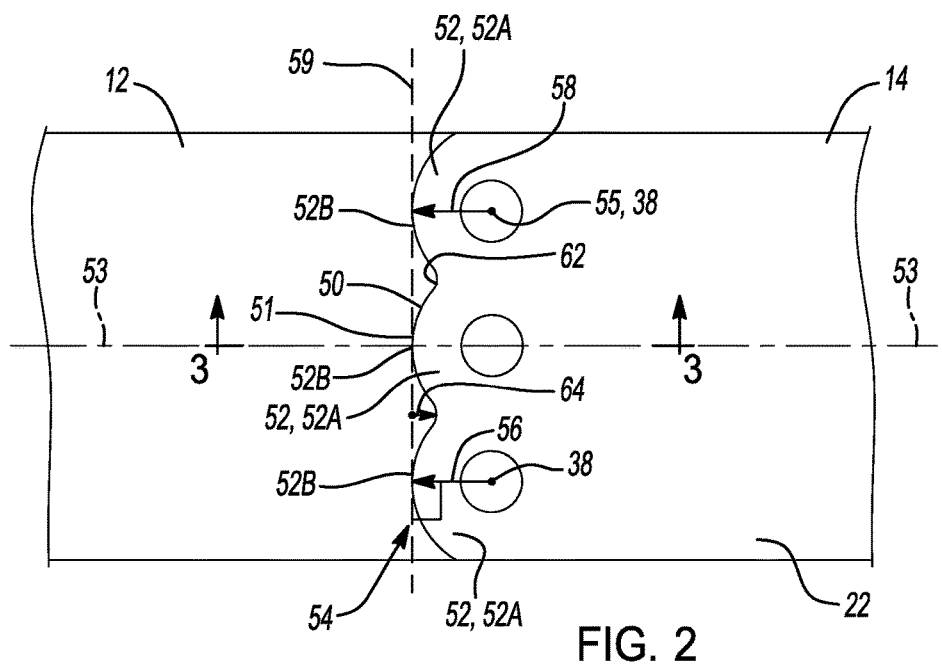
FIG. 2 shows the bottom view of the first embodiment of the invention of FIG. 1.

The following description is merely exemplary in nature and is not intended to limit the present invention. Referring to FIGS. 1 through 3, wherein like reference numerals correspond to like or similar elements throughout the figures, shown is an assembly 10 having a first member 12 joined with a second member 14 by one or more self-piercing rivets 15. Generally speaking, the first member 12 and the second member 14 may be any two components found within a motor vehicle including, for example, body panels, support members, decorative moldings, etc. Thus, the first and second members 12, 14 may be a sheet of material or a flange extending from an automotive component, but it is not meant to be so limited. The first member 12 may be formed of a metallic material typically found in automotive components, such as steel, copper, magnesium, aluminum, or a polymeric material such as a thermoplastic or thermoplastic composite. The second member 14 is formed of a polymeric composite such as a thermoplastic composite. Exemplary thermoplastic composites used in automotive applications include, but are not limited to fiber-reinforced thermoplastics (e.g. Polypropylene (PP), Polyurethane (PUR), Poly-Vinyl-Chloride (PVC), Acrylonitrile Butadiene Styrene (ABS), Polyamide (PA, Nylon 6/6, and Nylon 6), Polystyrene (PS), Polyethylene (PE), Polyoxymethylene (POM), Polycarbonate (PC), Polyethylene Terephthalate (PET), and Acrylonitrile styrene acrylate (ASA)).

The first member 12 includes a first or outer surface 16 and an opposite facing second or inner surface 18. Similarly, the second member 14 includes a first or inner surface 20 and an opposite facing second or outer surface 22. A portion of the inner surface 18 of the first member 12 defines an overlap area 24. Similarly, a portion of the inner surface 20 of the second member 14 defines an overlap area 26. The first member 12 and the second member 14 are positioned such that the inner surface 18 of the first member 12 contacts the inner surface 20 of the second member 14 continuously throughout the overlap areas 24, 26 to form an overlapped region 28 of the assembly 10.

The self-piercing rivets 15 fixedly attach the first member 12 with the second member 14. Each of the self-piercing rivets 15, best shown in FIG. 1, includes a head portion 30 and a body portion 32. The head portion 30 is generally disk-shaped with a substantially flat top surface 34 and a bottom surface 36. The body portion 32 is generally tubular in shape and extends outwardly along a central axis 38 away from the bottom surface 36 of the head portion 30. The body portion 32 includes a distal end 40 defining a tapered edge 42. The bottom surface 36 of the head portion 30 extends radially outwardly away from the central axis 38 further than the body portion 32, thereby defining an annular or flat surface 44. The self-piercing rivets 15 may be formed of a variety of high strength to weight metals such as steel, aluminum, or magnesium alloys. The self-piercing rivets 15 may be coated with a suitable protective coating, such as with an anti-corrosion agent, or may be selectively hardened at certain portion for achieving a hardness gradient in the self-piercing rivets 15. Furthermore, it should be appreciated that the self-piercing rivets 15 may have various other shapes and configurations without departing from the scope of the present disclosure.

The self-piercing rivets 15 are used to fasten the first member 12 to the second member 14 when the head portions 30 of the rivets 15 are subjected to a driving force. The process starts by clamping the first and second members 12, 14 together between a binder (not shown) and a die (not shown). The rivets 15 are then driven into the first and second members 12, 14. The rivets 15 pierce the first member 12 and the shape of the die causes the tapered edges 42 of the rivets 15 to flare within the second member 14 to form a mechanical interlock 46, which is clearly shown in FIG. 3A. Alternatively, the rivets 15 may be driven into the first member 12 and through the second member 14 until the tapered edge 42 is driven through the outer surface 22 of the second member 14. The die causes the rivets 15 to flare outwardly and upwardly toward the outer surface 22 of the second member 14 to form a rivet flange 48 abutting the second member 14 as shown in FIG. 3B.

Referring to FIG. 2, the second member 14 includes a distal end surface 50 having a distal end surface 51 connecting the inner and outer surfaces 20, 22. The distal end surface 50 defines a plurality of projections 52 extending along an axis 53 in a direction away from the main body of second member 14. In the example provided, the projections 52 are curved projections adjacent to one other, thereby defining a scalloped shape distal end 54. Each of the projections 52 include a body 52A with a distal geometric center or apex 52B. In the example provided, the body 52A is a curved symmetrical structure having a center point 55 with a radius 58. While the body 52A is depicted as a curved projection in FIG. 2, it should be appreciated that the body 52A may be a rectangle, square, triangle, oval or other shape that extends longitudinally from the distal end surface 50 without departing from the scope of the present disclosure. The projections 52 may be molded into the second member 14. Likewise, the first member 12 may include a plurality of projections 68 (shown in FIG. 1) complementary to that of the second member 14 or alternatively may have a flat, planar distal end or any other shape.

The rivets 15 are pierced in the overlapped region 28 of the assembly 10 such that each of the rivets 15 are disposed in one of the bodies 52A of the plurality of projections 52. Preferably, the rivet 15 extends through the body 52A in a location where a radial line 56 extending from the central axis 38 of the rivet 15 is perpendicular to a tangent 59 through the apex 52B.

In the example show in FIGS. 1 and 2, each of the rivets 15 are centered in the bodies 52A such that the central axis 38 of the rivet 15 is coincident with the center point 55 of the radius 58 of the body 52A. Preferably, the minimum distance from the apex 52B of the body 52A to the central axis 38 of the rivet 15 is at least 2 times the outer tubular diameter 61 of the body portion 32 of the rivet 15. The projections 52 provide sufficient additional material between the rivet 15 and the distal end surface 50 of the second member 14 to enhance the structurally integrity of the overlapped region 28, while eliminating non-essential materials between adjacent rivets 15. The curvature of the projection 52 assists in the dissipation of impact forces as the rivet 15 is driven into the second member 14 and deformed to interlock the first and second members 12, 14.

Separating adjacent bodies 52A is a semi-circular recession 62. A radius 64 of the semi-circular recession 62 is smaller than the radius 58 of the body 52A. The semi-circular recessions 62 aid in the dissipation of impact forces as the rivet 15 is driven into the second member 14 and distributes the stress loading between adjacent projections 52 to prevent tearing or fracturing of the second member 14. Likewise, the first member 12 may include a plurality of semi-circular recession 70 complementary (shown in FIG. 1) to that of the second member 14

Figure 3A:
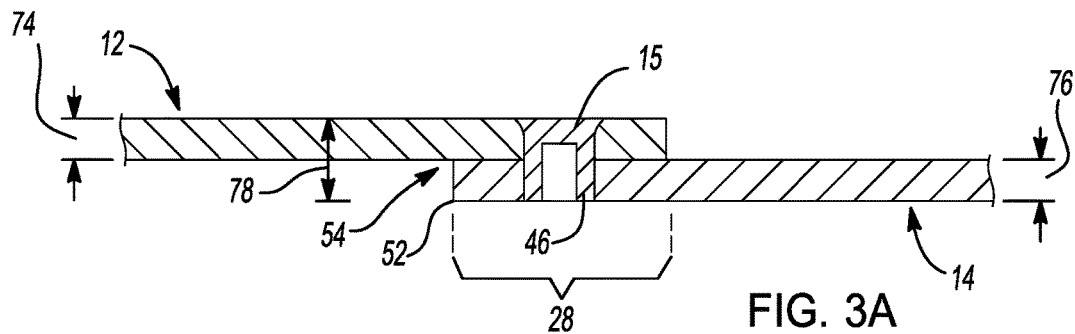
FIG. 3A shows a cross-section of the first embodiment along section line 3-3 of FIG. 2 with a first example of a rivet.
Figure 3B:
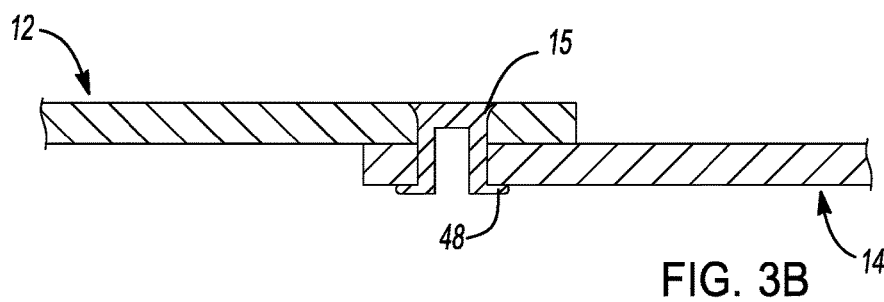
FIG. 3B shows a cross-section of the first embodiment along section line 3-3 of FIG. 2 with a second example of a rivet.

Referring to FIGS. 3A and 3B, it should be noted that the first member 12 includes a first member thickness 74 and the second member 14 includes a second member thickness 76. The thickness 78 of the overlapped region 28 is the sum of the thickness 74 of the first member 12 and the thickness 76 of the second member 14. The thicknesses of the members 12, 14 do not need to be increased in the overlapped region 28 to accommodate the stresses induced by the rivet 15 piercing through the members 12, 14 during the assembly process. In other words, the thicknesses 74, 76 are constant along the longitudinal length of the members 12, 14.

Figure 4:
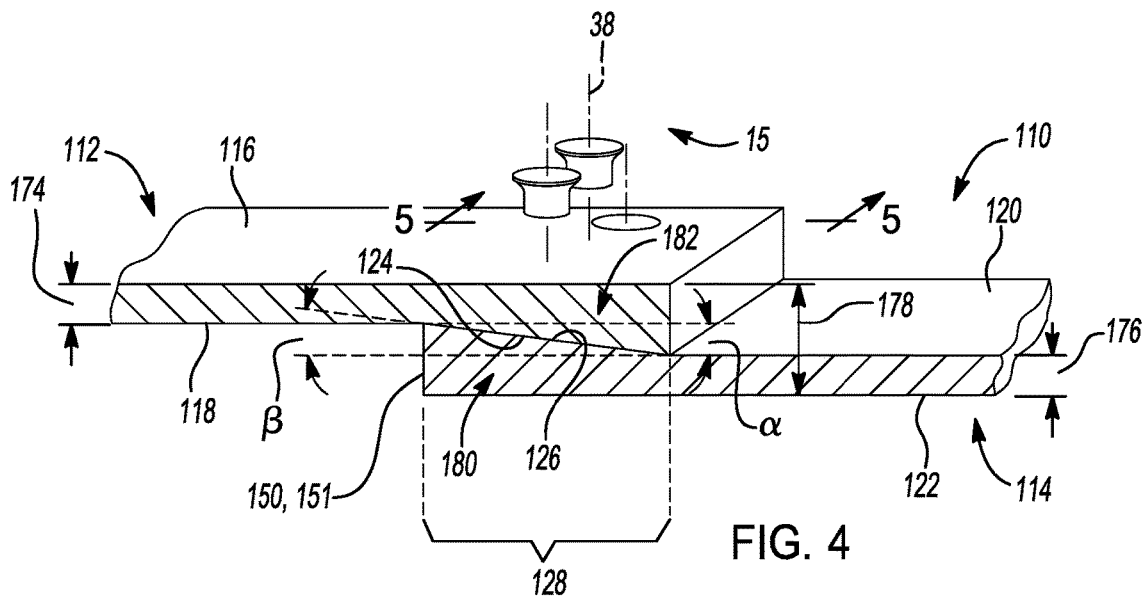
FIG. 4 shows an exploded perspective illustration of a second embodiment of the invention.
Figure 5:
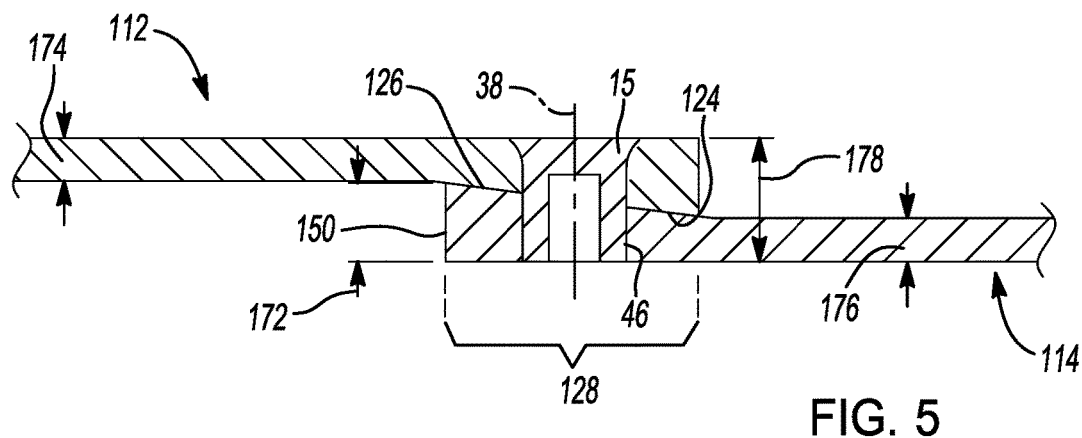
FIG. 5 shows a cross-section of the second embodiment along section line 5-5 of FIG. 4.

Turning now to FIGS. 4 and 5, another embodiment of an assembly is shown and indicated by reference number 110. The assembly 110 includes a first member 112 and a second member 114 joined by one or more of the self-piercing rivets 15. The distal end 150 of the second member 114 includes a planar surface having a thickness 172 that is greater than the thickness 176 of the second member 114 immediately before the transition to the overlapped region 128, thereby providing a sloping upper surface defining a chamfered segment 180. In other words, a portion of the inner surface 120 of the second member 114 defines a chamfered segment 180. Similarly, the inner surface 118 of the first member 112 defines a reverse chamfered segment 182. The slope, or angle α, of the chamfered segment 180 of the second member 114 is complementary to the slope, or angle β, of the reverse chamfered segment 182 of the first member 112.

The first member 112 is placed on the second member 114 such that the overlap area 124 of the first member 112 is in direct contact with the overlap area 126 of the bottom member 114, thereby forming an overlapped region 128. The thickness 178 of the joined members 112, 114 in the overlapped region 128 is greater than the sum of the thickness 174 of the first member 112 and the thickness 176 of the second member 114. The increased thickness 178 in the overlapped region 128 provides the additional structural integrity necessary to accommodate the stresses induced by the rivet 15 piercing through the members 112, 114.

The self-piercing rivet 15 is disposed through the first member 112 and at least partially through the second member 114 in the overlapped region 128. The tapered edge 42 is deformed radially outward from the central axis 38 of the rivet 15 into a portion of the second member 114, thereby locking the first member 112 to the second member 114. Alternatively, the sharpened tapered edge 42 may be deformed radially outward from the central axis 38 of the rivet 15 and upward toward the outer surface 122 of the second member 114 to form a rivet flange 48, thereby locking the first member 112 to the second member 114 between the head portion 30 of rivet 15 and the rivet flange 48.

Figure 6:
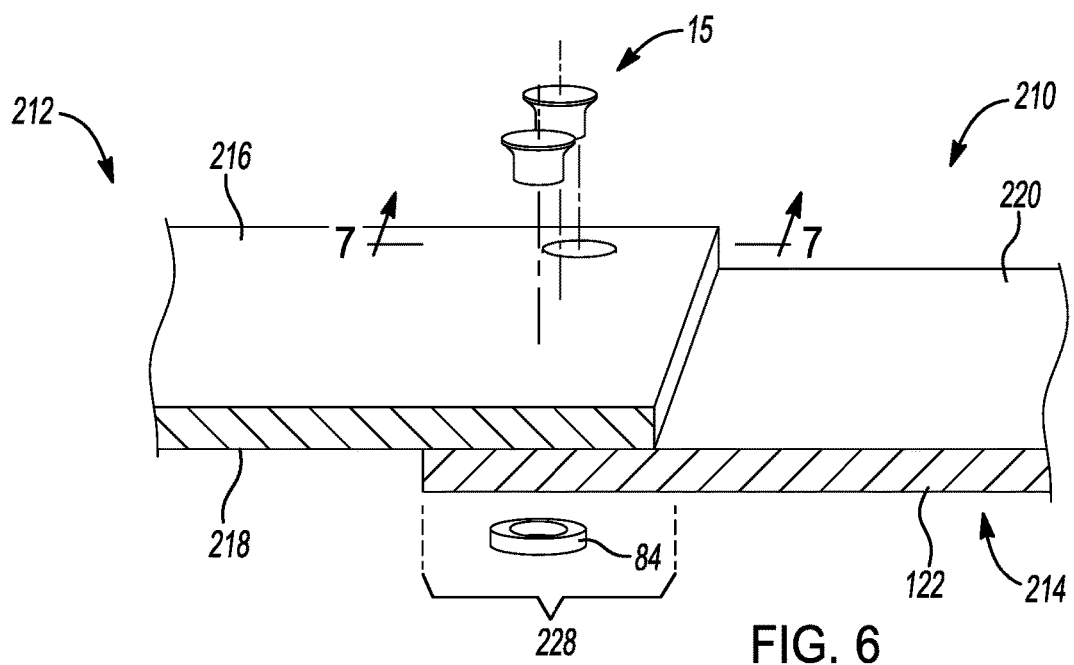
FIG. 6 shows an exploded perspective illustration of a third embodiment of the invention.
Figure 7:
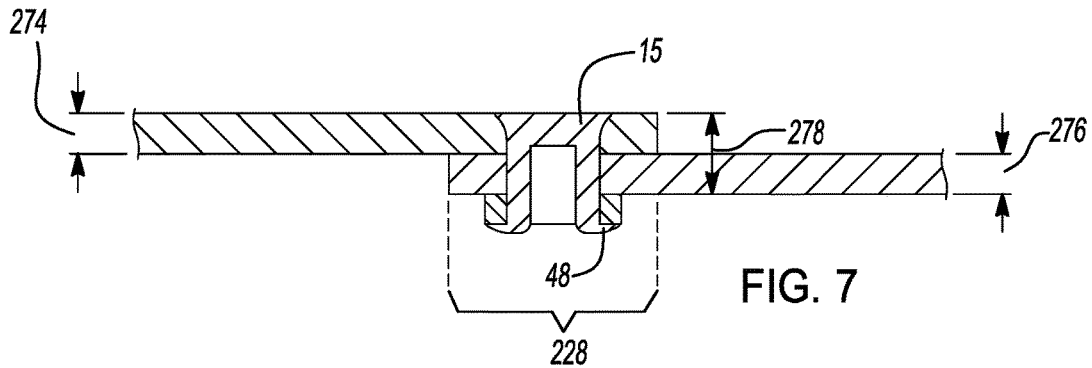
FIG. 7 shows a cross-section of the third embodiment along section line 7-7 of FIG. 6.

Turning now to FIGS. 6 and 7, another embodiment of an assembly is shown and indicated by reference number 210. A washer 84 is disposed against the bottom surface 222 of the second member 214 and is configured to accept the rivet 15. The rivet 15 is pierced through members 212, 214 and the tapered edge 42 is deformed radially outward from the central axis 38 of the rivet 15 and upward toward the washer 84 to form a rivet flange 48. The first member 212 is locked to the second member 214 between the head portion 30 of rivet 15 and the rivet flange 48. Alternatively, a work-piece or blank may be disposed against the bottom surface 222 of the second member 214 and the rivet 15 is pierced through members 212, 214 and the work-piece, thereby forming the equivalent of a washer 84 surrounding the rivet 15.

It should be noted that the second member 214 includes a bottom member thickness 274 and the first member 212 includes a top member thickness 276. The thickness 278 of the overlapped region 228 is the sum of the thickness 276 of the second member 214 and the thickness 274 of the first member 212. The thicknesses of the members 212, 214 do not need to be increased in the overlapped region 228 to accommodate the stresses induced by the rivet 15 piercing through the members 212, 214 during the piercing process.

Figure 8:
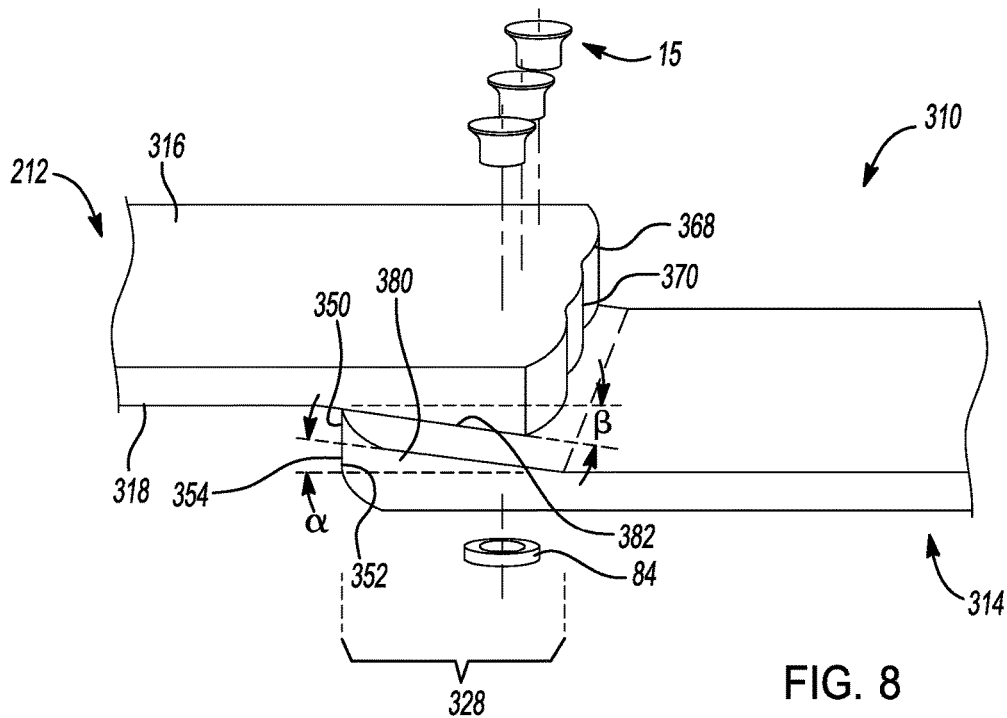
FIG. 8 shows an exploded perspective illustration of a fourth embodiment of the invention incorporating the features of the first three embodiments.

Turning now to FIG. 8, another embodiment of an assembly is shown and indicated by reference number 310. Assembly 310 incorporates the features of the first three embodiments of the assembly 10, 110, 210. The second member 314 of assembly 310 includes a distal end 350 having a plurality of curved projections 352 defining a scalloped shape end distal end 354. The first member 312 may also include a plurality of adjacent curved projections 368 complementary of that of the second member 314 and a semi-circular recession 370 between adjacent curved projections 368.

The second member 314 defines a chamfered segment 380. Similarly, the first member 312 defines a reverse chamfered segment 382. The slope, or angle α, of the chamfered segment 380 of the second member 314 is complementary to the slope, or angle β, of the reverse chamfered segment 382 of the first member 312. A rivet 15 is driven through the first member 312 and through the second member 314 in the overlapped region 328. A washer 84 is positioned beneath the second member 314 and is configured to accept the rivet 15. The combined features of the scalloped shape end distal end 354, the chamfered segments 380, 382, and washer 84 provides the additional structural integrity necessary to accommodate the stresses induced by the rivet 15 piercing through the members 312, 314.

The assembly having a self-piercing rivet jointing a composite member and method of joining a composite member described above may be used for attaching several different automotive components that are formed of metallic or polymeric materials. Example automotive components include various vehicle panels such as body panels, door panels, deck-lids, hoods, door frames, sunroof applications or the likes. Resulting joints are also considered part of the present invention.

It will be appreciated as well that the present invention is not limited to joining composite members, but may be employed to join articles in a different form or material. It should be understood that the invention is not limited to the exact embodiment or construction which has been illustrated and described but that various changes may be made without departing from the spirit and the scope of the invention.

The following is claimed:

1. An assembly comprising:
    a first member having a first overlap area;
    a second member having a second overlap area, wherein the overlap area of the first member is in direct contact with the overlap area of the second member, thereby forming an overlapped region, and wherein the second member includes an end defining a plurality of projections in the overlapped region; and
    a rivet disposed through the first member and at least partially through the second member in at least one of the projections, thereby interlocking the second member to the first member;
    wherein at least one of the projections include a body defining an apex, and wherein the rivet extends through the body such that a line extending from the center axis of the rivet is perpendicular to a tangent extending through the apex;
    wherein each of the plurality of projection is a curved symmetrical structure defining a scalloped shape distal end;
    wherein the distal end of the second member further defines a curved recess separating adjacent curved symmetrical structures, thereby defining an undulating scalloped shape end; and
    wherein each of the adjacent curved symmetrical structures includes a first radius and the curved recess includes a second radius, wherein the first radius is greater than the second radius.

2. The assembly of claim 1, wherein the rivet includes a tubular diameter, and wherein the central axis of the rivet is at least 2.0 tubular diameters from the apex.

3. The assembly of claim 1, wherein the assembly further comprises a washer in contact with the second surface of the second member in the overlapped region, wherein the rivet locks the washer against the second surface of the second member.

4. The assembly of claim 1, wherein the first member includes a first member thickness and the second member includes a second member thickness, and the overlapped region includes an overlapped region thickness that is equal to the sum of the thicknesses of the first and second members.

5. The assembly of claim 1, wherein the second member comprises a polymeric material comprising a thermoplastic.

6. The assembly of claim 1, wherein the second member comprises a polymeric composite material selected from the group consisting of Polypropylene (PP), Polyurethane (PUR), Poly-Vinyl-Chloride (PVC), Acrylonitrile Butadiene Styrene (ABS), Polyamide (PA, Nylon 6/6, Nylon 6), Polystyrene (PS), Polyethylene (PE), Polyoxymethylene (POM), Polycarbonate (PC), Polyethylene Terephthalate (PET), and Acrylonitrile Styrene Acrylate (ASA).

7. An assembly comprising:
a first member having a first surface and an opposite facing second surface defining a reverse chamfered segment;
a second member having a first surface defining a reverse chamfered segment and an opposite facing second surface, wherein the reverse chamfered segment of the first member is overlapped with the reverse chamfered segment of the second member, thereby forming an overlapped region, wherein the reverse chamfered segment of the first member is complementary to the reverse chamfered segment of the second member; and
at least one rivet extending through the first member and at least partially through the second member in the overlapped region, thereby interlocking the second member to the first member;
wherein the first member includes a first member thickness and the second member includes a second member thickness, and the overlapped region includes an overlapped region thickness that is greater than the sum of the thicknesses of the first and second members; and
wherein the second member includes a distal end defining a plurality of adjacent curved symmetrical structures and a curved recess separating immediately adjacent curved symmetrical structures, thereby defining an undulating scallop shaped distal end.

8. The assembly of claim 7, further comprising a washer disposed on the second surface of the second member in the overlapped region, and wherein the at least one rivet extends through the second member and deformed against the washer, thereby interlocking the washer against the second surface of the second member.

9. A method of joining two members, comprising the steps of:
(a) placing a first member onto a second member, wherein the first member includes a first surface and an opposite facing second surface defining an overlap area,
wherein the second member having a first surface defining an overlap area and an opposite facing second surface, and
wherein the overlap area of the first member is in direct contact with the overlap area of the second member, thereby forming an overlapped region;
(b) driving at least one rivet through the first member and at least partially through the second member in the overlapped region, wherein the at least one rivet includes a head portion defining a bottom surface and a tubular portion extending outwardly from the bottom surface of the head along a central axis, and the tubular portion includes a tapered edge; and
(c) deforming the tubular portion and tapered edge radially outward from the central axis of the rivet, thereby interlocking the second member to the first member;
wherein the second member includes a distal end in the overlapped region defining at least one curved projection;
wherein the at least one curved projection is a curved symmetrical structure defining a curve apex, and wherein step (b) includes driving the rivet in the overlapped region where a radius extending from the central axis of the rivet is perpendicular to a tangent extending through the curve apex; and
wherein the second member comprises a polymeric material selected from the group consisting of Polypropylene (PP), Polyurethane (PUR), Poly-Vinyl-Chloride (PVC), Acrylonitrile Butadiene Styrene (ABS), Polyamide (PA, Nylon 6/6, Nylon 6), Polystyrene (PS), Polyethylene (PE), Polyoxymethylene (POM), Polycarbonate (PC), Polyethylene Terephthalate (PET), and Acrylonitrile Styrene Acrylate (ASA).

10. The method of claim 9, wherein step (b) includes driving the rivet in the overlapped region at a distance from the curve apex such that the curved symmetrical structure provides sufficient structural integrity to prevent fracturing of the second member in the overlapped region resulting from the driving and deforming of the rivet.

11. The method of claim 10, further includes the step of placing a washer on the second surface of the second member in the overlapped region, wherein step (b) further includes driving the rivet through the second member in the overlapped region such that the tapered edge extends beyond the second surface of the second member and through the washer, and wherein step (c) further includes deforming the tapered edge radially outward from the central axis of the rivet and axially in contact with the washer in the direction of the second surface of the second member, thereby interlocking the washer against the second surface of the second member.

12. The method of claim 9, wherein the overlap area of the second surface of the first member defines a reverse chamfered segment and wherein the overlap area of the first surface of the second member defines a reverse chamfered segment complementary to the reverse chamfered segment of the first member.

* * * * *